United States Patent
Starkie et al.

(10) Patent No.: US 6,329,785 B1
(45) Date of Patent: Dec. 11, 2001

(54) PULSE WIDTH MODULATED CONTROLLED INDUCTION MOTOR

(75) Inventors: Alan Starkie; Nickolas G. Vrionis, both of Los Altos, CA (US)

(73) Assignee: Gas Research Institute, Chicago, IL (US)

(*) Notice: Subject to any disclaimer, the term of this patent is extended or adjusted under 35 U.S.C. 154(b) by 0 days.

(21) Appl. No.: 09/515,943

(22) Filed: Feb. 29, 2000

(51) Int. Cl.[7] ....................................................... H02P 5/28
(52) U.S. Cl. ........................ 318/811; 378/441; 378/599; 378/809; 378/767; 378/808; 378/812
(58) Field of Search .................... 318/811, 441, 318/599, 809, 767, 808, 812; 363/124

(56) References Cited

U.S. PATENT DOCUMENTS

| | | | |
|---|---|---|---|
| 4,641,234 | * 2/1987 | Bonal | 363/124 |
| 4,788,485 | * 11/1988 | Kawagishi et al. | 318/811 |
| 5,057,760 | * 10/1991 | Dadpey et al. | 318/807 |
| 5,268,628 | * 12/1993 | Dongll | 318/809 |
| 5,883,490 | 3/1999 | Moreira . | |

OTHER PUBLICATIONS

Sewan Choi: Analysis and design of a direct AC to AC matrix converter topology, *A Thesis by Sewan Choi*, pp. i–x and 1–77, Dec. 1992.

Enjeti, P.N. et al.: An approach to realize higher power PWM AC controller, *Applied Power Electronics Conference and Exposition*, 1993, Eighth Annual, pp. 323–327, Mar. 1993.

J. Oyama et al.: New control strategy for matrix converter, *Power Electronics Specialists Conference*, 1989, pp. 360–367, vol. 1, Jun. 1989.

Choe et al.: An improved PWM technique for AC choppers, *Power Electronics, IEEE Transactions*, pp. 496–505, vol. 4, Oct. 1989.

* cited by examiner

Primary Examiner—Karen Masih
(74) Attorney, Agent, or Firm—Pauley Petersen Kinne & Fejer

(57) ABSTRACT

A commercial application for a four-step switching PWM single phase AC controller for a load such as an induction motor or the like has a digital microcontroller for PWM signal generation and enhanced MOSFET switching control, and provides a multiplicity of discrete speed settings to make any single phase AC driven device easily and cheaply converted to efficient variable speed operation. Only two MOSFET gate drive optocouplers are provided on the high side of line voltage for reduced cost. Series transistors are programed to be left full on at maximum motor speed for increased efficiency. Current limit and under voltage sensing for fault protection are provided.

30 Claims, 5 Drawing Sheets

PULSE WIDTH MODULATED CONTROLLED INDUCTION MOTOR

BACKGROUND OF THE INVENTION

1. Field of the Invention

The present invention relates generally to controllers for AC driven loads. It relates specifically to pulse width modulated (PWM) controllers for variable speed induction motors.

2. Discussion of the Related Art

Reduction of AC power to an inductive load is often problematic due to lack of a path for the necessary discharge current flow from an inductor when the current is interrupted. Also, power reduction, or interruption, may introduce undesired noise into the line. For example, a traditional dimmer switch utilizing triacs may introduce unwanted noise into the line. Variacs are good for reduction of AC power but are too expensive and bulky for many applications.

As another example, control of induction motors to achieve variable speeds is problematic due to increased noise and inefficient operation. Further, when line power is switched off to the load back emf from inductance may damage sensitive components in the power controller if not properly channeled. Ideally, an "electronic variac" being reasonable in size and cost would solve many practical problems for adjustable power delivery to a load.

PWM controllers have been proposed in the past for use with induction motors to resolve many of the shortcomings inherent in trying to use induction motors in variable speed applications. See, for example, *An Approach to Realize Higher Power PWM AC Controller*, Enjeti and Choi, Applied Power Electronics Conference and Exposition, 1993. APEC '93 Conference Proceedings, 1993, Eighth Annual, pages 323–327 (IEEE: 0-7803-0982-0/93). Enjeti and Choi teach that while the PWM controlled AC controller for regulating power to the motor will decrease unwanted harmonics, commutation problems for controlling switching of inductive load current can be difficult. They propose a four step switching strategy for control of two bidirectional semiconductor switches routing the load current. An experimental controller is detailed as a proof of concept vehicle for steady speed, generalized, inductive load applications.

Four-step switching is a method of controlling bidirectional switches in an alternating current (AC) application so that back electromotive force (emf) from an inductive load is never presented with an open circuit thus allowing it to increase to a large value that destroys the circuitry.

Referring to FIG. 1, the bidirectional switches S1, S2 are configured from a pair of inverse serial connected MOSFET transistors S1A, S1B and S2A, S2B, respectively. The inverse parallel diodes D1A, D1B, D2A, D2B inherent to each MOSFET are shown because they are essential in providing a circulating current path when the inductive load is switched. The complete switch for an inductive load L is comprised of a series switch S1 and a shunt switch S2. In general, the series switch S2 provides current to the inductive load L and the shunt switch S1 provides a circulating or freewheel path for the current in the inductive load L when the series switch S2 is turned off.

It can be seen that conventional switching methods have problems in the configuration of FIG. 1. If a dead band in switching time is provided between, for instance, the turn off of S1 and the turn on of S2, then the back electromotive force would increase during the time that both switches were off and potentially destroy the circuit. If some overlap in switching time is allowed then the shoot through current as S1 and S2 are connected across the AC supply is potentially destructive.

To illustrate the operation of the four-step switching method, one complete switching transition will be described. With reference to FIGS. 1 and 2 consider the transition between S1 on and S2 off to S1 off and S2 on, when the polarity of the AC supply is as shown.

Initially S1A and S1B are on and S2A and S2B are off.

(1) S2B is turned on, nothing happens because S2A is off.

(2) S1A is turned off, the potential on S1A source rises until the on S2B forward biases the inverse parallel diode of S2A. This provides a circulatory path for the inductive load current and the back electromotive force is trapped at slightly more than line potential.

(3) S2A is turned on, nothing significant happens because S2A's diode is already conducting.

(4) S1B is turned off, nothing happens because S1A is already off.

The transition is now complete. It will be appreciated that the switching sequence must be different if the line polarity is opposite and for that reason detection of line polarity must be provided. For a complete description of all transitions and polarities the reader is referred to the Enjeti and Choi article.

However, certain improvements to the Enjeti and Choi four step commutation controller were deemed necessary to make their controller scheme a practical reality for commercial applications of AC power control such as dimmer switches or blower motors of heating, ventilation and air conditioning (HVAC) systems where a variable speed, low noise, long life, fractional horsepower motor could greatly improve the efficiency of HVAC systems. It is these improvements which are the subject of the present invention.

SUMMARY OF THE INVENTION

The present invention comprises, in one aspect, to any single phase AC line power controller for controlling power to an AC operated device, or load. In an exemplary embodiment a PWM controller is coupled to the stator windings of a permanent split capacitor induction motor. The controller may be a retrofit package or integrated into the original motor unit. In a preferred embodiment the controller is used to control power to the main windings only. A separate triac switch is used for controlling power to the auxiliary windings. In other aspects of the present invention the controller comprises an economical power supply providing isolation and power to the controller and gate drivers. A digital circuit is implemented to provide PWM control signals as well as timing for the commutation, or switching, of the semiconductor switches which control inductive load current between the series circuit supplying power to the load and the freewheeling, or shunt, circuit which routes the inductive load current when the series circuit is not conducting. Enhanced control precision and control signal input is thereby attained as well as economy of parts supply and heat reduction in the controller. Also, the programmable logic is constructed to be intolerant of incorrect switching states to prevent motor damage to the controller or the load. Further refinements include isolating only the one set of switch drivers, such as the shunt switch drivers, while leaving the series circuit drivers nonisolated. The series switches provided are also rated at a higher power than the shunt switches. The controller further provides for a one hundred percent duty cycle of the series switches and turning off the shunt switches when the load draw is at a maximum for a given application. Over-current or shorting protection, as well as under-voltage protection is provided through fault sensing circuitry to prevent conditions injurious to the controller or load. Finally, series inductance and shunt capacitance values for a line filter are chosen to absorb energy stored in the inductance of the power line and mitigate resonant effects due to this inductance thus avoiding voltage spikes during commutation and consequent disruption or damage of the circuit.

By utilizing any, or all, of these aspects of the present invention singly or in combination, an economical, efficient, low noise, long life, commercially viable controller system may be obtained.

BRIEF DESCRIPTION OF THE DRAWINGS

The above-mentioned and other features and objects of this invention will be better understood from the following detailed description taken in conjunction with the drawings wherein.

DETAILED DESCRIPTION OF THE PRESENTLY PREFERRED EMBODIMENTS

Figure 3:
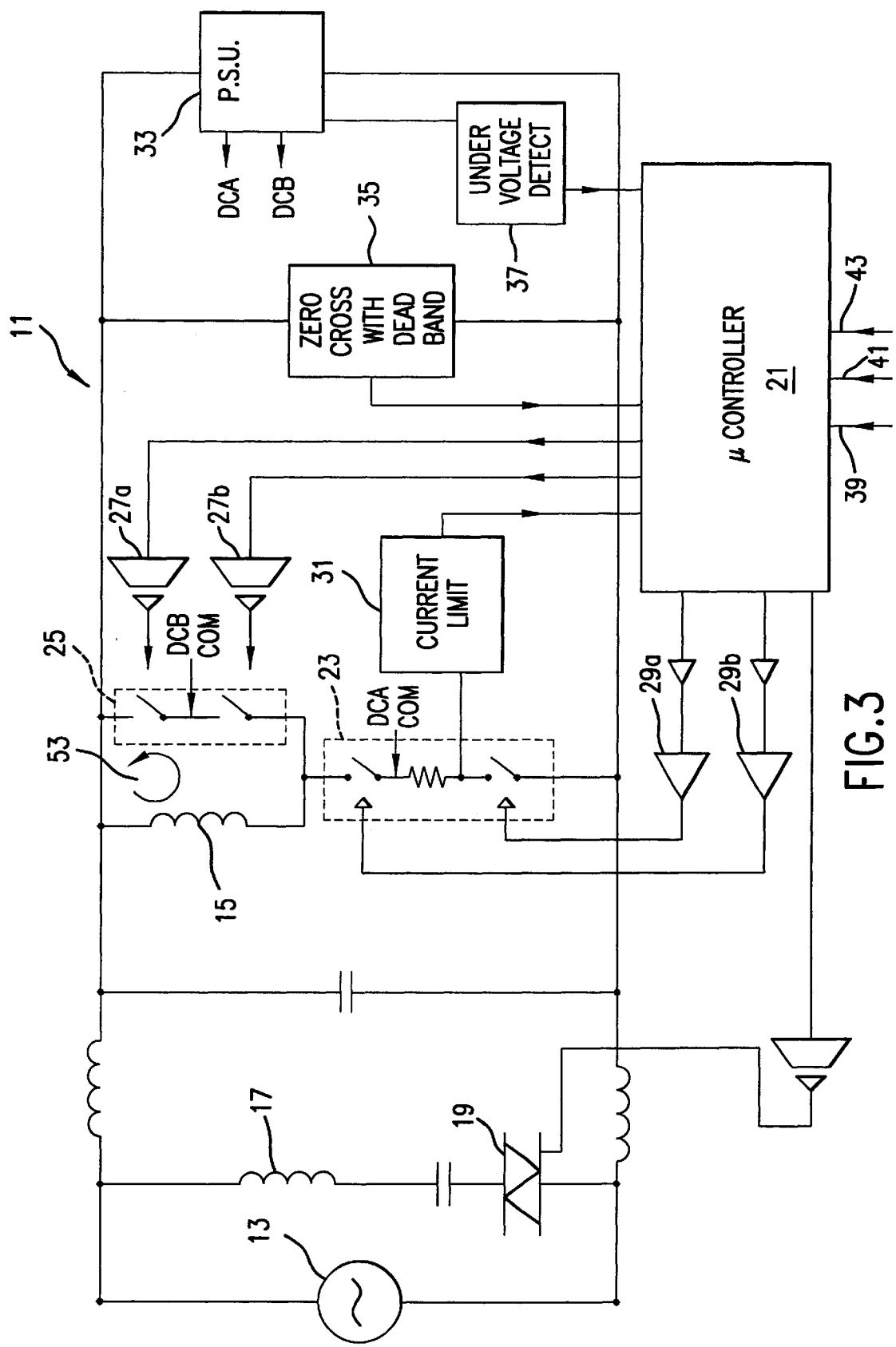
FIG. 3 is a block diagram of the present invention showing the stator coils and PWM controller system.

Referencing the block diagram of FIG. 3, a variable power controller is illustrated in the context of a variable speed controller 11 connected between a single phase AC voltage supply 13 and the main coils 15 of a stator for an induction motor, which may be of the permanent split capacitor, fractional horsepower type used in HVAC applications. The auxiliary windings 17 are preferably independently controlled by a triac 19 which is turned on when the PWM signal is greater than zero, so as to provide a steady sinusoidal power component to the motor. Enhanced motor speed control and lessened current handling through the controller also result. Alternatively, the auxiliary windings 17 may also be controlled like the main windings 15 through the controller 11.

The controller 11 preferably comprises a number of functional blocks including a digital microcontroller 21 for pulse width modulated (PWM) signal implementation and timing, or a sequencing, of the bidirectional series switch 23 and bidirectional shunt switch 25.

Figure 4:
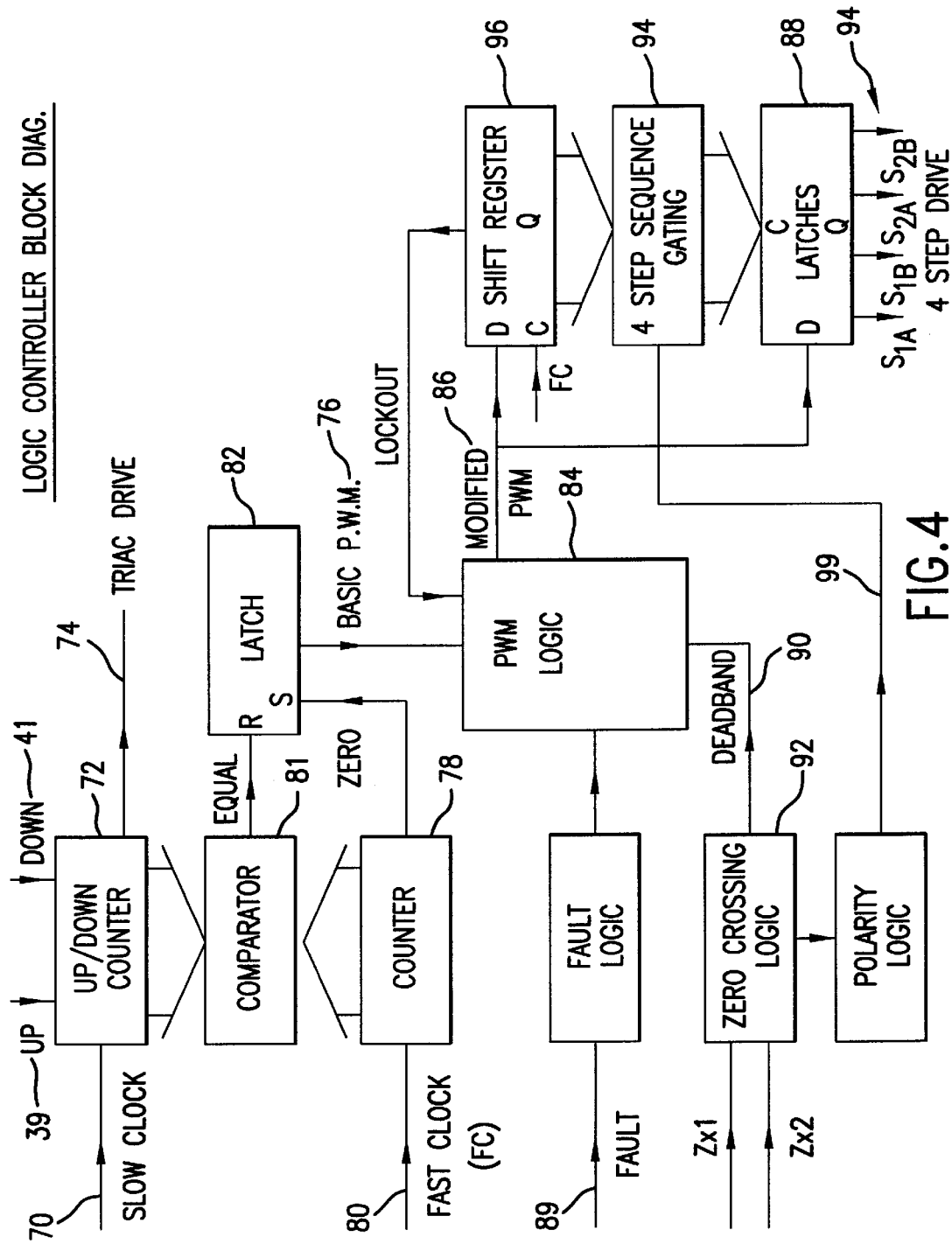
FIG. 4 is a block diagram of the microcontroller functions for the present invention.

Referencing FIG. 4 for synthesis of basic PWM signal within the microcontroller 21, the up and down, or increment and decrement signals 39, 41 are the external inputs controlling the speed of the motor. The slow clock signal 70 may be derived internally or externally. The up and down inputs 39, 41 allow a speed setting number to be inserted into the up/down counter 72. This number, e.g. between 0 and 16, represents the load control signal. For example, 0 is off, 16 is full on, and the numbers in between are fractions of total power input. If the speed setting number is greater than zero the triac drive signal 74 for the auxiliary winding is turned on. The speed setting number is converted into a duty cycle or basic pulse width modulated (PWM) signal 76 as follows: the fast clock counter 78 is clocked by the fast clock input 80 and when it passes through zero it sets a latch 82. When the number in the fast clock counter 78 equals the speed setting number stored in the up/down counter 72 a comparator 81 resets the latch 82. Thus the output of the latch 82 is a PWM representation of the speed setting number in counter 78.

Concerning modifications to basic PWM signal, a PWM logic block 46 accepts the basic PWM signal 76 in hardware or firmware of the microcontroller and allows fault conditions and zero crossing of the line voltage to overrule the basic PWM signal for control of the load via a modified PWM signal 86. But the fault conditions and zero crossing can only enter an overrule state and thereby change the state of the output latches 88 via a four step sequence. Otherwise, excessive back electromotive force and circuit damage could occur. When a fault signal 89 occurs, a high PWM signal is switched low. This low state is reset before the next high PWM to give pulse-by-pulse response to the fault condition. When the AC line is within approximately 10 volts of zero the PWM signal is prevented from changing state by the dead band 90 output of the zero crossing logic 92.

Concerning the generation of four-step output signals 94, the four bit shift register 96 receives the modified PWM signal 86 as its data input and is clocked by the fast clock signal 80. Thus each edge of the modified PWM signal 86 is followed by four sequentially delayed edges at the Q outputs 94 of the shift register 88. These delayed edges provide the timing for the four-step switching sequence. The delayed edges must be delayed from each other by at least the maximum propagation delay time from the microcontroller IC output to the source switching of the MOSFETs. The optocouplers account for most of this delay and, for cost effective implementation such as the preferred embodiment, the optocouplers chosen limit this delay to a minimum of around one microsecond. A lockout signal 98 is asserted whenever the input to the shift register 96 and the output have different states. The lockout signal 98 prevents the modified PWM signal 86 from changing state until the edge has propagated through the shift register 96, thus ensuring that, once begun, a four-step sequence will be completed. Whenever the control outputs change state either a positive of a negative edge propagates through the four bit shift register 96. During this time the input and the output of the shift register are at different logic levels. An exclusive OR gate is used to detect this condition and assert the lockout condition.

The four-step gating routes the appropriate edges from the shift register 96 to the clocks of the output latches 88. The polarity signal 99 causes an appropriately different routing in each half cycle of the line.

A pair of isolated drivers 27a, 27b are provided for the shunt switch 25 and a pair of non-isolated drivers 29a, 29b are provided for the series switch 23. A current limit circuit 31 provides fault detection to shut down the motor in over-current conditions such as a locked rotor situation in the motor. A power supply 33 provides necessary DC voltages for the controller components such as microcontroller 21 and switches 23, 25 and incorporates a zero crossing detector 35 with dead band region built in for safety. Alternatively, the power supply may be simplified further by using a 24 VDC feed from a furnace. In such case, the switches 23, 25 would both require isolated drivers since the 24 VDC supply is ground referenced. But the control inputs 39, 41, 43 to the microcontroller 21 need not be isolated. An under-voltage detection circuit 37 provides fault detection to shut down the motor where improper voltages exist within the controller 11 which may impair its performance.

Figure 5:
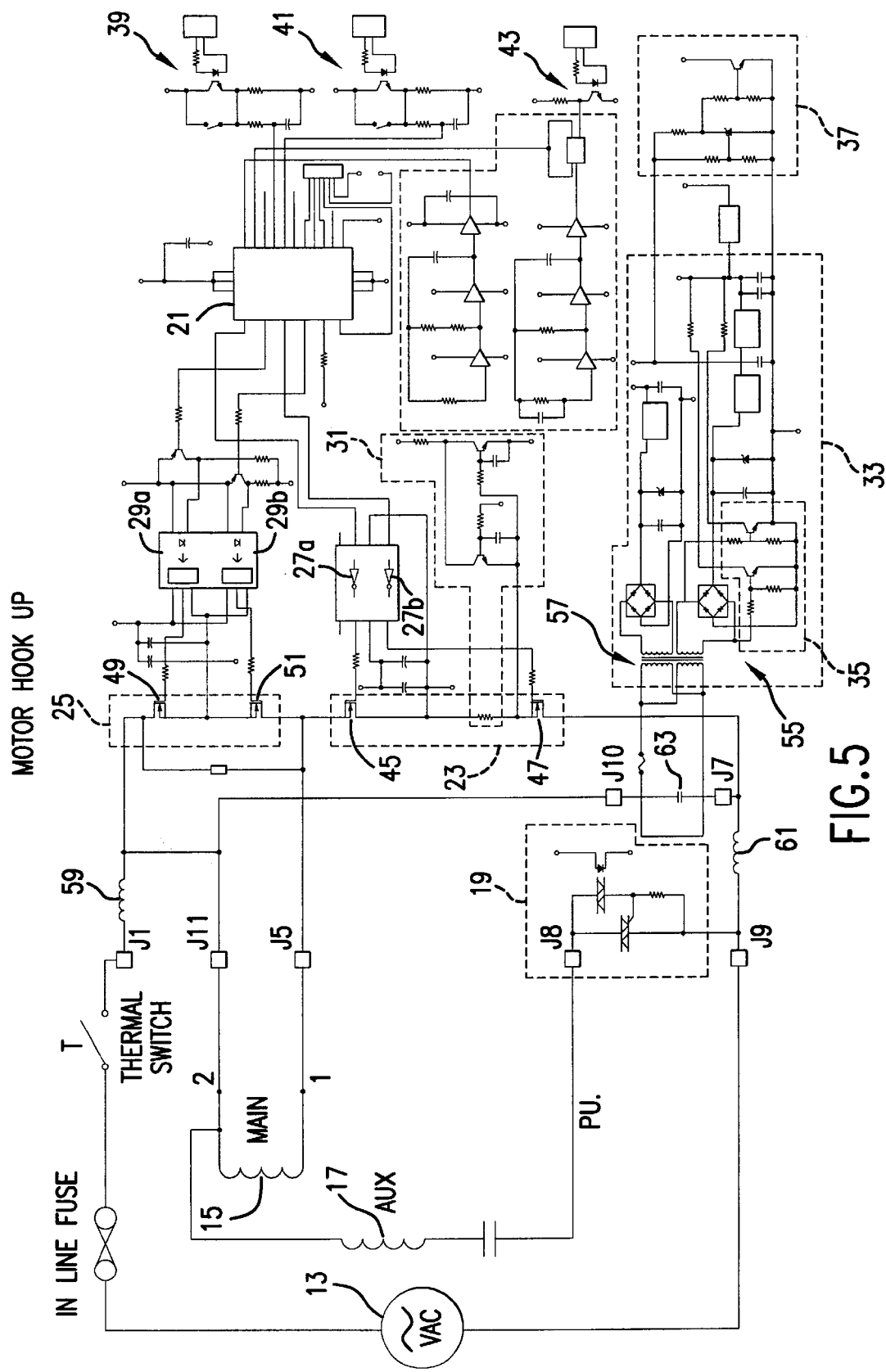
FIG. 5 is a detailed schematic of a preferred embodiment of the present invention.

Referencing FIG. 5, three electronically isolated control inputs 39, 41 and 43 are preferably provided for accepting motor speed demand signals from a master motor speed system such as a thermostat (not shown) in the case of an HVAC application where the motor is running a blower. The control inputs 39, 41 and 43 are fed to the digital microcontroller 21 which may be a complex programmable logic controller, an application specific integrated circuit, or the like. Other control signal input schemes may be adapted to use with the present invention, such as two wire input or the like. The digital microcontroller 21 decodes the control inputs and synthesizes, or implements, in known fashion, PWM signals matched to the known motor and load torque curve in order to derive the appropriate pulse train, or duty cycle, to drive the series switch 23 thereby powering at least the main coil 15 to attain the desired motor speed. Because speed variation is limited only by the capacity of the microcontroller 21, sixteen steps, or speed variations, are easily implemented. But, it will be appreciated that with, for example, 256 or more steps the speed of the motor in most applications may be considered continuously variable. Triac 19 will be turned on to power the auxiliary coil as necessary.

Figure 2:
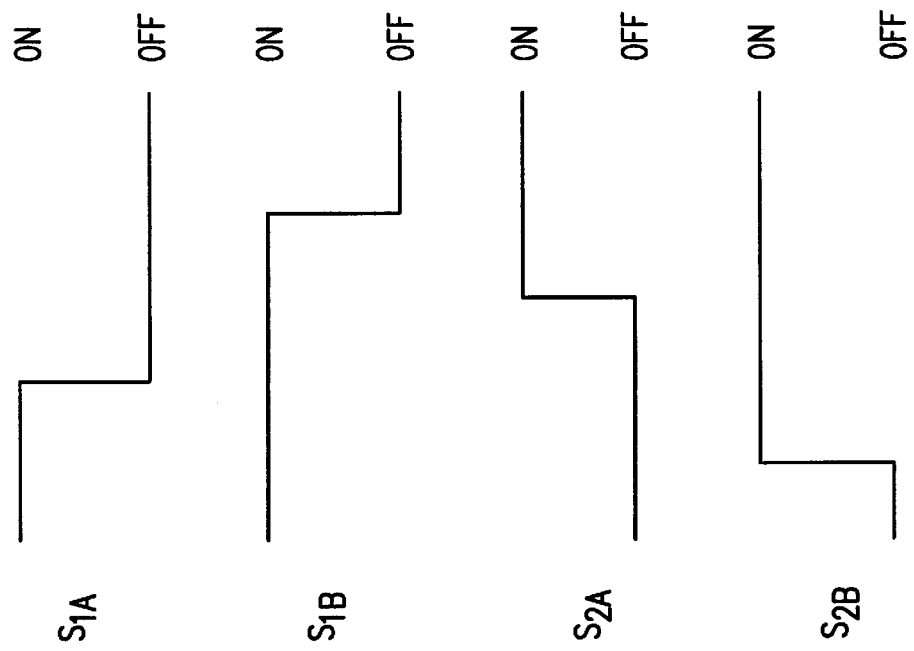
FIG. 2 is a timing diagram for operation of the switches of FIG. 1 as known in the art.
Figure 1:
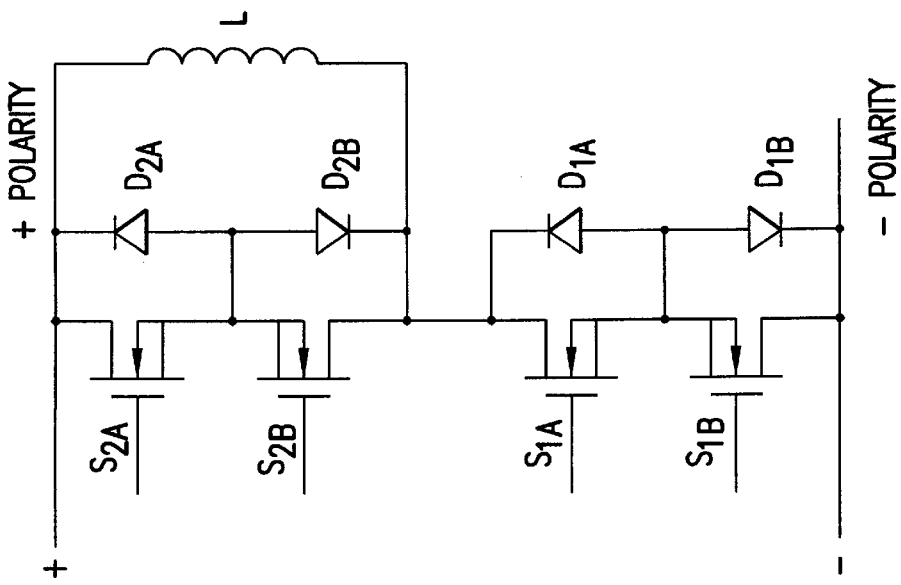
FIG. 1 is a schematic of two switches used with the present invention as known in the art.

The bidirectional series switch 23 and bidirectional shunt switch 25 of FIG. 3, are both implemented as two inverse serial connected MOSFETs 45, 47 and 49, 51, respectively. As known in the art, when the series switch 23 does not conduct, the back electromagnetic force, or inductive load current, must be routed through the freewheel loop, or shunt path, illustrated by arrow 53 in FIG. 1, provided by closing shunt switch 25, in order to prevent inefficient operation of, or even damage to, the motor or the controller. The timing of the basic four step commutation scheme between each switch half or MOSFET, is generally set forth above. A preferred control strategy is a 100% run time for the series switch at high motor speeds and shut off of the shunt switch to avoid excess switch delay times and further smooth motor operation.

The shunt drive signals are fed through high current rated, optoelectronically isolated, drivers 29a, 29b to provide isolation between the shunt transistors and the digital microcontroller 21. The series drivers 27a, 27b and the digital controller are driven from a common power supply and therefore are driven by more economical non-isolated drivers.

The current limit circuit 31 is connected across the main power supply line so that, if excess current begins to be drawn by the motor, a fault condition signal will be triggered and detected at the digital microcontroller 21. The motor can then be shut down.

Figure 6:
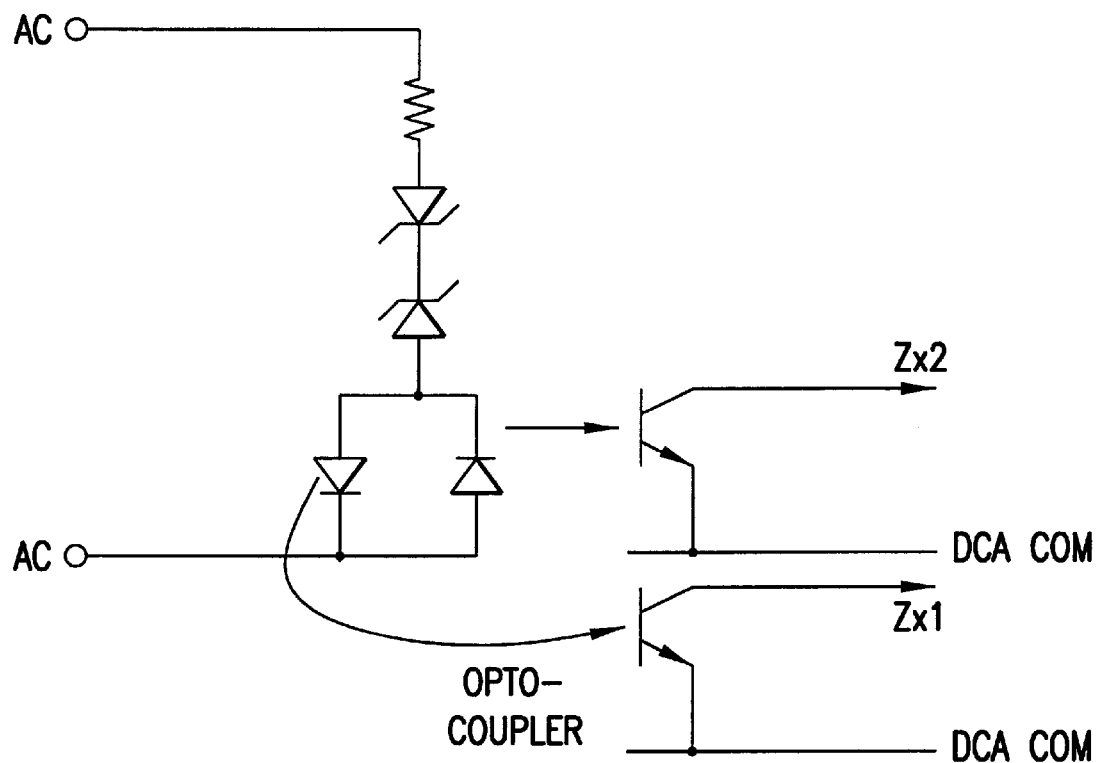
FIG. 6 illustrates an alternative zero crossing detector with dead band.

An economical power supply 33 provides two isolated power supplies 55, 57 from line power for five volt and fifteen volt power within the controller, respectively. A zero crossing detector 35 with dead band is provided within the power supply 33 to provide necessary polarity detection for commutation of the switches 23, 25. An alternative optoelectronically-coupled zero crossing detector with dead band is shown in FIG. 6. The dead band is a safety zone of ten volts on either side of zero in which no switching action will be taken to make sure the proper polarity of the half line cycle is determined. The dead band is controlled by base bias on the detector transistors. An under-voltage detection circuit 37 is connected to the power supply 33 and provides a fault signal to the digital microcontroller 21 to cease motor operation if inadequate voltage exists to drive the MOSFET gates.

Line filtering for reduced noise is provided by a suitably sized pair of coils, e.g., 50 $\mu$H, on the line voltage 59 and neutral line 61 and a suitably sized filter capacitor 63, e.g., 10 $\mu$F, placed between the input voltage lines to absorb inductive current when the series switches are turned off and before the shunt switches turn on, in essence assuring a continuous conduction path. The series circuit inductance values and shunt circuit capacitance values of the filter coils 59, 61 and capacitor 63 are selected to absorb energy stored in the inductance of the power line and mitigate resonant effects due to this inductance thus preventing injurious voltage spikes.

The triac 19 connected to the auxiliary windings 17 is turned on by the digital microcontroller 21 whenever the PWM signal is nonzero, and off when the speed demand is zero. Alternatively, the auxiliary windings may be controlled by the switching transistors of the controller.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A 4-step PWM switching controller for a variable speed induction motor having a stator and a rotor, the stator having main and auxiliary coils, comprising:
   a) four transistors arranged as two bidirectional switches, one switch controlling current to an inductive load and a second switch controlling a freewheeling path for inductive current when the first switch is not conducting;
   b) a power supply with only two isolated secondaries for receiving a single phase AC voltage and generating power for the controller;
   c) a digital controller having a PWM signal generator for accepting environmental demand signals dictating motor speed and generating PWM signals therefrom operative to create a duty cycle for the current path sufficient to bring the motor to the dictated speed;
   d) the digital controller further having commutation logic for switching the transistors in a set pattern with switching delays effective to allow use of the current path and the freewheeling path;
   e) two isolated gate drives for switching one of the bidirectional switches on and off in proper sequence;
   f) two non-isolated gate drives for switching the other of the bidirectional switches on and off in proper sequence; and
   g) the switches being connectable to at least some of the coils of the stator.

2. The 4-step PWM switching controller of claim 1 wherein each bidirectional switch is comprised of two transistors arranged as two inverse serial connected MOSFETS.

3. The 4-step PWM switching controller of claim 1 wherein the switches are between only the main stator coils and a single phase AC voltage.

4. The 4-step PWM switching controller of claim 3 wherein there is a triac between the auxiliary coils and a single phase AC voltage.

5. The 4-step PWM switching controller of claim 1 wherein the switches are between the auxiliary coils and a single phase AC voltage.

6. The 4-step PWM switching controller of claim 1 wherein the speed is continuously variable.

7. The 4-step PWM switching controller of claim 1 wherein the power supply has a zero crossing detector with a dead band.

8. The 4-step PWM switching controller of claim 1 wherein the speed demand is input through optoelectronic isolators.

9. The 4-step PWM switching controller of claim 4 wherein there are three optoelectronic isolators for accepting the speed demand.

10. The 4-step PWM switching controller of claim 1 wherein the two isolated gate drives are optoelectronically isolated.

11. A 4-step PWM switching controller for a variable speed induction motor having a stator and a rotor, the stator having main and auxiliary coils, comprising:
   a) a series path with a bidirectional switch therein comprised of two transistors for delivering current to the main coils, the auxiliary coils, or both;
   b) a shunt path with a bidirectional switch therein comprised of two transistors for delivering current to a freewheeling loop when the series path switch is non-conducting;
   c) a digital controller having a PWM signal generator for accepting environmental demand signals dictating motor speed and generating PWM signals therefrom operative to create a duty cycle for the current path sufficient to bring the motor to the dictated speed, the digital controller further having commutation logic for switching the transistors in a set pattern with switching delays effective to allow use of the current path and the freewheeling path;
   d) the series transistors connectable to the motor so as to control the signals to the main windings;
   e) the transistor drivers including two optocoupler isolated drivers for one switch path.

12. The 4-step PWM switching controller of claim 11 further having commutation logic for maximum motor speed operation wherein the series path transistors run 100% and the shunt transistors are turned off 100%.

13. The 4-step PWM switching controller of claim 11 wherein the power supply has a zero crossing detector with a dead band.

14. The 4-step PWM switching controller of claim 11 wherein the digital PWM generator circuit is a PLC.

15. The 4-step PWM switching controller of claim 11 wherein the transistors are MOSFETs.

16. The 4-step PWM switching controller of claim 11 wherein the two series transistors are higher current-rated than the shunt transistors.

17. The 4-step PWM switching controller of claim 11 further comprising fault protection for shutting down the motor in case of over-current or under-voltage conditions.

18. The 4-step PWM switching controller of claim 11 further comprising a triac for turning on the auxiliary winding when the PWM signal is non-zero.

19. The 4-step PWM switching controller of claim 11 further comprising the shunt path having capacitance selected to absorb energy stored in the inductance of the power line.

20. The 4-step PWM switching controller of claim 11 further comprising the series path having inductance selected to mitigate resonant effects due to power line inductance.

21. A 4-step PWM switching controller for output of a variable AC voltage for a load comprising:
   a) two bidirectional switches, one switch controlling current to an inductive load and a second switch controlling a freewheeling path for inductive current when the first switch is not conducting;
   b) a digital controller having a PWM signal generator for accepting environmental demand signals dictating load operation and generating PWM signals therefrom operative to create a duty cycle for the current path sufficient to bring the load to the dictated operation;
   c) the digital controller further having commutation logic for switching the transistors in a set pattern with switching delays effective to allow use of the current path and the freewheeling path;
   d) two isolated gate drives for switching one of the bidirectional switches on and off in proper sequence;
   e) two non-isolated gate drives for switching the other of the bidirectional switches on and off in proper sequence; and
   f) the switches being connectable to the load.

22. A 4-step PWM switching controller for output of a variable AC voltage for a load comprising:
   a) a series path with a bidirectional switch therein comprised of two transistors for delivering current to load;
   b) a shunt path with a bidirectional switch therein comprised of two transistors for delivering current to a freewheeling loop when the series path switch is non-conducting;
   c) a digital controller having a PWM signal generator for accepting environmental demand signals dictating current to the load and generating PWM signals therefrom operative to create a duty cycle for the current path sufficient to drive the load at the desired level, the digital controller further having commutation logic for switching the transistors in a set pattern with switching delays effective to allow use of the current path and the freewheeling path; and
   d) the series transistors connectable to the load so as to control the signals thereto.

23. The 4-step PWM switching controller of claim 22 further having commutation logic for AC load operation wherein the series path transistors run 100% and the shunt transistors are turned off 100%.

24. The 4-step PWM switching controller of claim 22 wherein the power supply has a zero crossing detector with a dead band.

25. The 4-step PWM switching controller of claim 22 wherein the digital PWM generator circuit is a PLC.

26. The 4-step PWM switching controller of claim 22 further including a power supply providing operating power to the controller.

27. The 4-step PWM switching controller of claim 22 further comprising fault protection for shutting down the controller in case of over-current or under-voltage conditions.

28. The 4-step PWM switching controller of claim 22 further comprising the shunt path having capacitance selected to absorb energy stored in the inductance of the power line.

29. The 4-step PWM switching controller of claim 22 further comprising the series path having inductance selected to mitigate resonant effects due to power line inductance.

30. The 4-step PWM switching controller of claim 22 further comprising inductive and capacitive filters between the controller and the load.

* * * * *